(12) United States Patent
Perincherry et al.

(10) Patent No.: US 12,608,621 B2
(45) Date of Patent: Apr. 21, 2026

(54) GENERATING ARTIFICIAL VIDEO WITH CHANGED DOMAIN

(71) Applicant: Ford Global Technologies, LLC, Dearborn, MI (US)

(72) Inventors: Akhil Perincherry, Dearborn, MI (US); Arpita Chand, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 798 days.

(21) Appl. No.: 18/065,672

(22) Filed: Dec. 14, 2022

(65) Prior Publication Data

US 2024/0202533 A1 Jun. 20, 2024

(51) Int. Cl.
G06N 3/09 (2023.01)
G06N 3/045 (2023.01)
(Continued)

(52) U.S. Cl.
CPC .............. *G06N 3/09* (2023.01); *G06N 3/094* (2023.01); *G06V 10/7715* (2022.01); *G06V 10/776* (2022.01); *G06V 10/7788* (2022.01); *G06V 10/806* (2022.01); *G06V 10/82* (2022.01); *G06V 20/58* (2022.01); *G06N 3/045* (2023.01); *G06N 3/047* (2023.01); *G06N 3/08* (2013.01); *G06N 3/088* (2013.01); *G06T 9/002* (2013.01); *H04N 5/265* (2013.01); *H04N 19/139* (2014.11);
(Continued)

(58) Field of Classification Search
CPC .......... G06N 3/09; G06N 3/094; G06N 3/045; G06N 3/047; G06N 3/088; G06N 3/08;

G06V 10/7715; G06V 10/776; G06V 10/82; G06V 20/58; H04N 5/265; H04N 19/172; H04N 19/182; H04N 19/139; H04N 19/42; G06T 9/002
See application file for complete search history.

(56) References Cited

U.S. PATENT DOCUMENTS 10,885,111 B2    1/2021  Chaudhury et al.
2020/0134426 A1*  4/2020  Ketz ..................... G06N 3/0464
(Continued)

FOREIGN PATENT DOCUMENTS

CN      113935418 A    1/2022
CN      114419204 A    4/2022

OTHER PUBLICATIONS

Aldausari, N, et al., "Video Generative Adversarial Networks: a Review," ACM Comput. Surv., vol. 55, No. 2, Article 30, Jan. 2022, 10 pages.

*Primary Examiner* — Quoc A Tran
(74) *Attorney, Agent, or Firm* — Frank A. MacKenzie; Brooks Kushman P.C.

(57)                ABSTRACT

A computer includes a processor and a memory, and the memory stores instructions executable by the processor to receive an input video of a scene and audio data associated with the input video, the input video being in a first domain; execute an encoder to map the input video and the audio data to a latent vector in a lower-dimensional latent space; and execute a generator to generate an output video of the scene from the latent vector, the output video being in a second domain. The encoder and the generator are trained to maintain temporal consistency between the input video and the output video by using the audio data.

20 Claims, 6 Drawing Sheets

(51) Int. Cl.

| | |
|---|---|
| *G06N 3/047* | (2023.01) |
| *G06N 3/08* | (2023.01) |
| *G06N 3/088* | (2023.01) |
| *G06N 3/094* | (2023.01) |
| *G06T 9/00* | (2006.01) |
| *G06V 10/77* | (2022.01) |
| *G06V 10/776* | (2022.01) |
| *G06V 10/778* | (2022.01) |
| *G06V 10/80* | (2022.01) |
| *G06V 10/82* | (2022.01) |
| *G06V 20/58* | (2022.01) |
| *H04N 5/265* | (2006.01) |
| *H04N 19/139* | (2014.01) |
| *H04N 19/172* | (2014.01) |
| *H04N 19/182* | (2014.01) |
| *H04N 19/42* | (2014.01) |

(52) U.S. Cl.
CPC .......... *H04N 19/172* (2014.11); *H04N 19/182* (2014.11); *H04N 19/42* (2014.11)

(56) References Cited

U.S. PATENT DOCUMENTS

| | | | |
|---|---|---|---|
| 2020/0234725 A1* | 7/2020 | Garbacea | ................ G10L 25/30 |
| 2020/0242507 A1 | 7/2020 | Gan et al. | |

* cited by examiner

GENERATING ARTIFICIAL VIDEO WITH CHANGED DOMAIN

BACKGROUND

Video can be acquired by image sensors such as cameras and processed using a computer to determine data regarding objects in an environment around a system. Operation of a sensing system can include acquiring accurate and timely data regarding objects in the system's environment. A computer can acquire video from one or more image sensors that can be processed to determine locations of objects. Object location data extracted from video can be used by a computer to operate systems including vehicles, robots, security, and object-tracking systems. Machine-learning algorithms can be used on board vehicles to operate advanced driver assistance systems (ADAS) or perform autonomous operation based on detecting objects in video, e.g., taken by cameras on board vehicles as the vehicles are driving.

DETAILED DESCRIPTION

Figure 1:
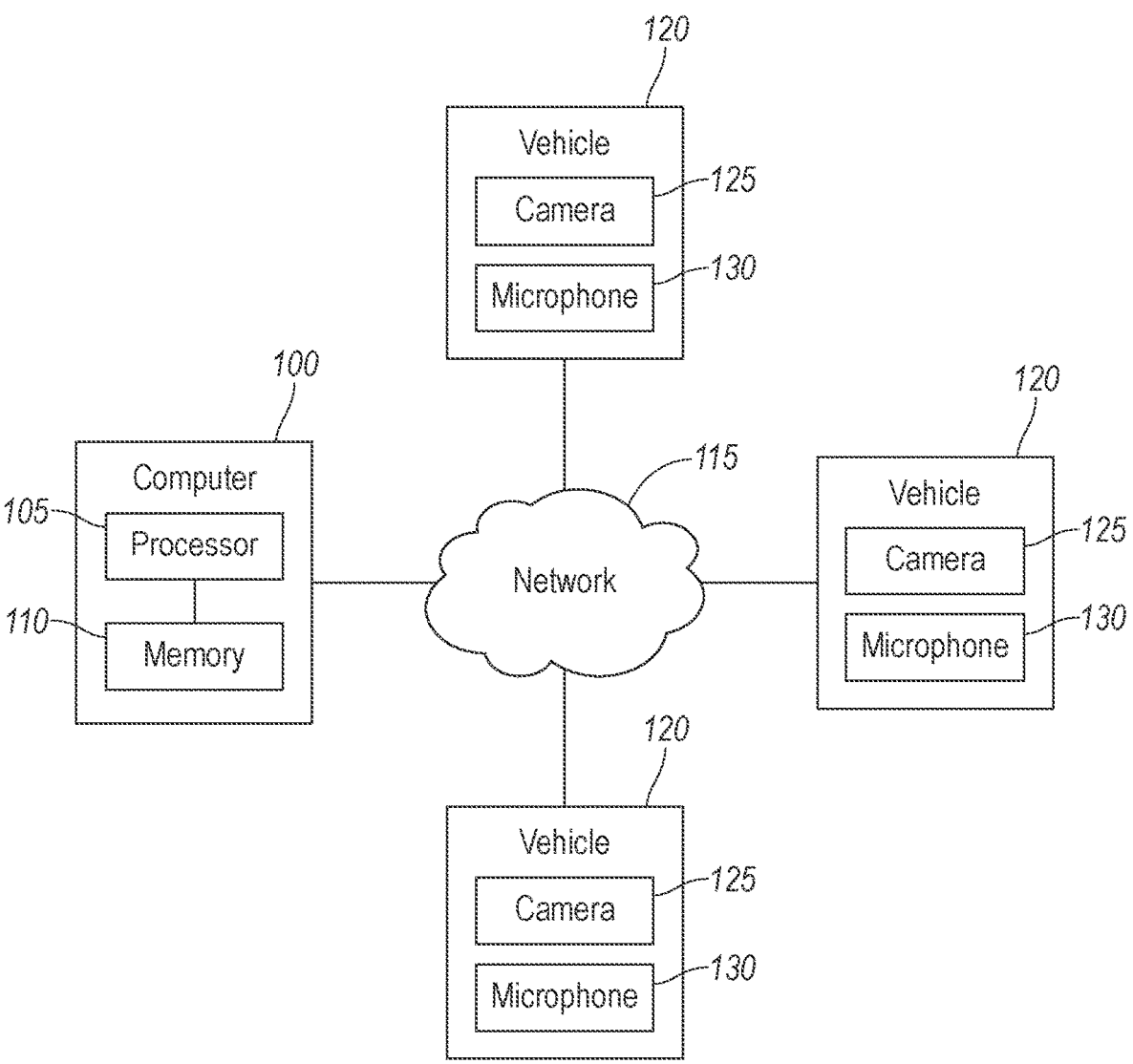
FIG. 1 is a block diagram of an example system for collecting and analyzing video data.

This disclosure presents techniques for generating an artificial output video based on an input video. The output video has the same semantic content as the input video. For example, the semantic content in both the input video and the output video may show the point of view of a vehicle traveling along a particular stretch of road, with the same other vehicles, surrounding environment, etc. However, the output video has a changed domain from the input video. The domain may be changed from daytime to nighttime, clear to rainy, low-resolution to high-resolution, red-clear-clear-clear (RCCC) to red-green-blue (RGB), etc. Because the output video is artificial, i.e., synthetic, video in the new domain does not need to be manually collected. Having a dataset of videos in different domains can be useful for training a machine-learning algorithm for tasks such as object recognition that can depend on interpreting domain data. To that end, the techniques herein can provide diversity in training data and targeting of particular scenarios, both of which may contribute to a trained machine-learning algorithm with an enhanced ability to generalize.

An issue that can arise when generating the output video is maintaining a temporal consistency with the input video, e.g., ensuring that events occur or objects move at the same time in the output video as in the input video. As described herein, audio data is used to supervise the generation of the output video in order to maintain the temporal consistency. The audio can be generated contemporaneously with the input video. (As used herein, the term "video" refers to sequential visual data, not to audio data.) The audio data provides a way to track events in a manner that generally excludes domain data in order to conform the output video to the same temporal sequence as the input video. In particular, a computer is programmed to receive an input video of a scene in a first domain and audio data associated with the input video, execute an encoder to map the input video and the audio data to a latent vector in a lower-dimensional latent space, and execute a generator to generate an output video of the scene in a second domain from the latent vector. The encoder and the generator are trained to maintain temporal consistency between the input video and the output video by using the audio data. The use of the latent vector helps to strip away the domain data while preserving the semantic content of the input video.

A computer includes a processor and a memory, and the memory stores instructions executable by the processor to receive an input video of a scene and audio data associated with the input video, the input video being in a first domain, execute an encoder to map the input video and the audio data to a latent vector in a lower-dimensional latent space, and execute a generator to generate an output video of the scene from the latent vector, the output video being in a second domain. The encoder and the generator are trained to maintain temporal consistency between the input video and the output video by using the audio data.

In an example, the encoder and the generator may be supervised by a discriminator during training. In a further example, the discriminator may supervise the training of the encoder and the generator by testing a consistency of the output video with the audio data. In a yet further example, while training the encoder and the generator, the discriminator may use a correlation between the output video and the audio data to test the consistency of the output video with the audio data. In a still yet further example, while training the encoder and the generator, the discriminator may receive the correlation from a correlation module, and the correlation module may be pretrained with contrastive learning.

In another further example, the discriminator may supervise the training of the encoder and the generator by testing a consistency of the output video with the second domain. In a yet further example, the instructions may further include instructions to determine an adversarial loss based on an output of the discriminator and to update the encoder and the generator based on the adversarial loss.

In an example, the first domain and the second domain may be mutually exclusive environmental conditions of the scene. In a further example, the environmental conditions may be one of a lighting condition or a weather condition.

In an example, the first domain and the second domain may be mutually exclusive visual rendering characteristics of the input video and output video. In a further example, the visual rendering characteristics are one of a resolution, a color representation scheme, or simulatedness.

In an example, the instructions may further include instructions to extract visual features from the input video, and executing the encoder may be based on the visual features. In a further example, the instructions may further include instructions to extract audio features from the audio data and to fuse the visual features and the audio features, and executing the encoder may be based on the fusion of the visual features and the audio features.

In an example, the instructions may further include instructions to extract audio features from the audio data, and executing the encoder is based on the audio features.

In an example, the encoder may be trained to include semantic content of the input video in the latent vector and to exclude domain data of the input video from the latent vector.

In an example, the encoder may be a first encoder, the generator may be a first generator, the latent vector may be a first latent vector, and training the first encoder and the first generator may include executing a second encoder to map the output video and the audio data to a second latent vector in the lower-dimensional latent space, and executing a second generator to generate a test video of the scene from the second latent vector in the first domain. In a further example, training the first encoder and the first generator may include updating the first encoder and the first generator based on a difference between the test video and the input video.

In an example, the instructions may further include instructions to train a machine-learning model on training data, and the training data includes the output video. In a further example, the machine-learning model is an object-recognition model.

A method includes receiving an input video of a scene and audio data associated with the input video, the input video being in a first domain, executing an encoder to map the input video and the audio data to a latent vector in a lower-dimensional latent space, and executing a generator to generate an output video of the scene from the latent vector, the output video being in a second domain. The encoder and the generator are trained to maintain temporal consistency between the input video and the output video by using the audio data.

With reference to the Figures, wherein like numerals indicate like parts throughout the several views, a computer 100 includes a processor 105 and a memory 110, and the memory 110 stores instructions executable by the processor 105 to receive an input video 205 of a scene and audio data 210 associated with the input video 205, the input video 205 being in a first domain; execute an encoder 215 to map the input video 205 and the audio data 210 to a latent vector 220 in a lower-dimensional latent space; and execute a generator 225 to generate an output video 230 of the scene from the latent vector 220, the output video 230 being in a second domain. The encoder 215 and the generator 225 are trained to maintain temporal consistency between the input video 205 and the output video 230 by using the audio data 210.

With reference to FIG. 1, the computer 100 is a micro-processor-based computing device, e.g., a generic computing device including the processor 105 and the memory 110, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory 110 electrically connected to the FPGA circuit. The computer 100 can thus include the processor 105, the memory 110, etc. The memory 110 of the computer 100 can include media for storing instructions executable by the processor 105 as well as for electronically storing data and/or databases, and/or the computer 100 can include structures such as the foregoing by which programming is provided. The computer 100 can be multiple computers coupled together.

The computer 100 is connected to a network 115. The network 115 represents one or more mechanisms by which the computer 100 may communicate with remote servers. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services. The computer 100 can communicate with, e.g., a plurality of vehicles 120 including cameras 125 and microphones 130 and/or a plurality of standalone cameras 125 and microphones 130.

The vehicles 120 may be any passenger or commercial automobiles such as cars, trucks, sport utility vehicles, crossovers, vans, minivans, taxis, buses, etc.

The cameras 125 can detect electromagnetic radiation in some range of wavelengths. For example, the cameras 125 may detect visible light, infrared radiation, ultraviolet light, or some range of wavelengths including visible, infrared, and/or ultraviolet light. For example, each camera 125 can be a charge-coupled device (CCD), complementary metal oxide semiconductor (CMOS), or any other suitable type. For another example, the cameras 125 may be a time-of-flight (TOF) cameras, which include a modulated light source for illuminating the environment and detect both reflected light from the modulated light source and ambient light to sense reflectivity amplitudes and distances to the scene.

The cameras 125 generate video data, which may be used as described below as the input video 205. The video data are sequences of image frames depicting the scenes contained in the fields of view of the respective cameras 125. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the field of view.

The image data includes semantic content and domain data. For the purposes of this disclosure, "semantic content" is defined as the physical features of the environment and the objects populating the environment within the scene captured in a video. For example, the semantic content of a video captured by a camera 125 mounted to a vehicle 120 may include the road, sidewalks, other terrain, buildings and infrastructure, other vehicles, pedestrians, bicyclists, etc.

For the purposes of this disclosure, a "domain" is a characteristic or condition affecting the scene as a whole or the image frame as a whole. Multiple domains may apply to a given video. For example, domains may include environmental conditions, e.g., lighting conditions such as daytime versus nighttime, overcast versus sunny, sun angle, etc., or weather conditions such as clear, foggy, rainy, snowy, etc. For another example, domains may include visual rendering characteristics such as resolution, color representation scheme, simulatedness, etc. The resolution is the sharpness of the image frame, e.g., as represented by the pixel density. The color representation scheme is how colors are represented pixel-by-pixel in the image frame, e.g., red-green-blue (RGB), red-clear-clear-clear (RCCC), etc. The simulatedness is how realistic versus computer-generated surfaces appear in the image frame, e.g., no textures, computer-generated texture, photorealistic, etc.

The input video 205 is in a first domain, and the output video 230 is in a second domain. The first domain and the second domain may be mutually exclusive domains of a same type. The first and second domains are mutually exclusive in that the first and second domains are different and nonoverlapping. A type of domain is a group of domains of which at most one domain applies to a given video or image frame. For example, a type can be cloud cover, and the possible domains of that type can include overcast, mostly cloudy, partly cloudy, and sunny. For another example, a type can be color representation scheme, and the possible domains of that type can be RGB, RCCC, and black-and-white.

The microphones 130 are transducers that convert sound to electrical signals. Each microphone 130 can be any suitable type, e.g., a dynamic microphone, which includes a coil of wire suspended in a magnetic field; a condenser microphone, which uses a vibrating diaphragm as a capacitor plate; a contact microphone, which uses a piezoelectric crystal; etc.

The microphones 130 generate the audio data 210. The audio data 210 is recorded sound data in any suitable format, e.g., a standard audio file format such as .wav. The audio data 210 includes sound as a function at least of time. For example, the audio data 210 may be represented as spectrogram, which shows amplitude as a function of time and frequency. The audio data 210 is associated with the input video 205, e.g., is recorded in the scene depicted in the input video 205 contemporaneously with recording the input video 205. For example, audio data 210 may be time-synchronized to the input video 205.

Figure 2:
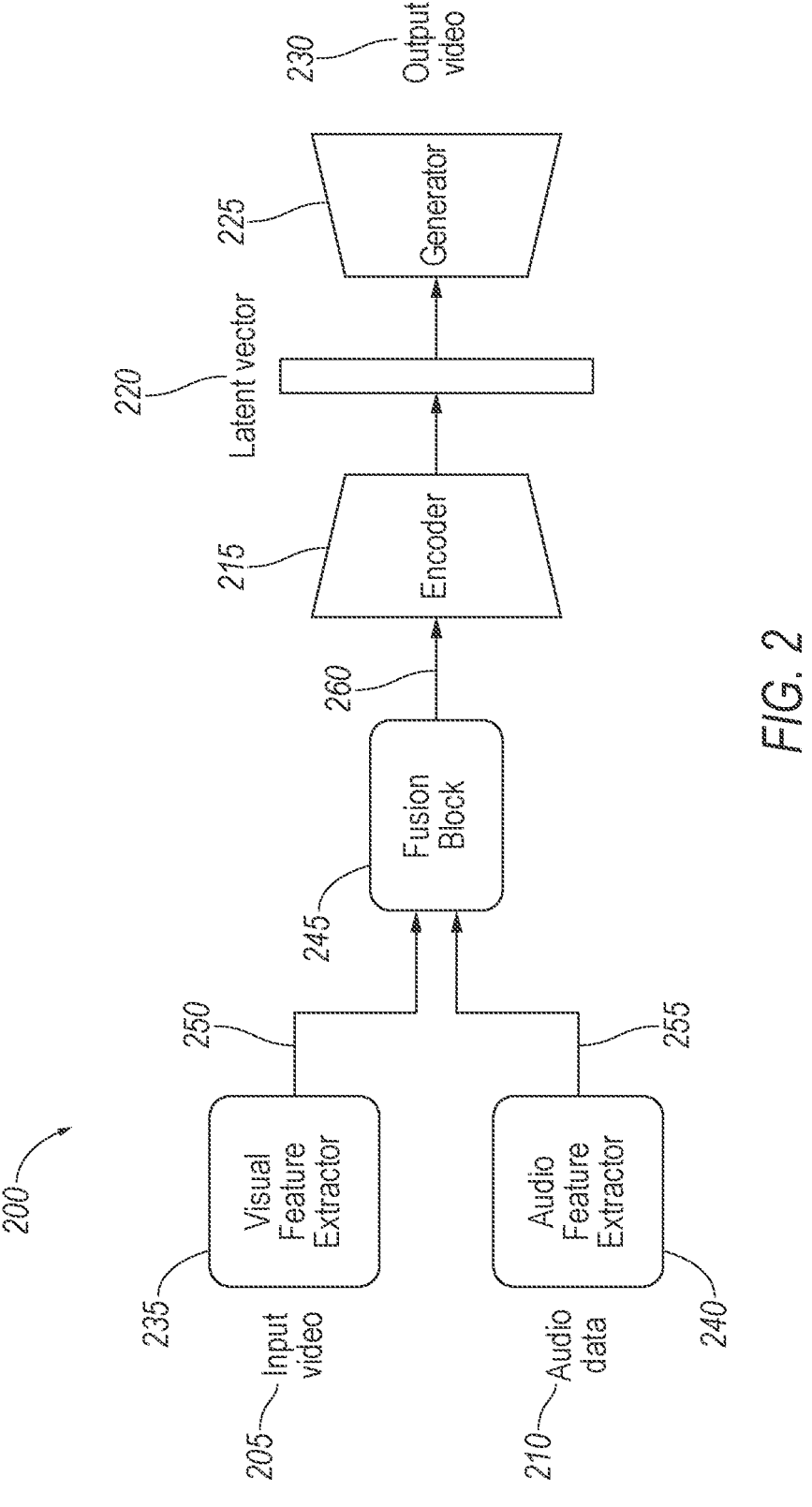
FIG. 2 is a diagram of an example machine-learning architecture for generating an artificial video.

With reference to FIG. 2, a machine-learning architecture 200 is shown that is trained to generate the output video 230 in the second domain based on the input video 205 in the first domain and based on the audio data 210 associated with the input video 205. The machine-learning architecture 200 may be trained for a specific first domain and second domain. (The training of the machine-learning architecture 200 is described below with respect to FIGS. 4-6.) The machine-learning architecture 200 may include a visual feature extractor 235, an audio feature extractor 240, a fusion block 245, the encoder 215, and the generator 225. The visual feature extractor 235 extracts visual features, e.g., in the form of a visual feature map 250, from the input video 205. The audio feature extractor 240 extracts audio features, e.g., in the form of an audio feature map 255, from the audio data 210. The fusion block 245 fuses the visual feature map 250 and the audio feature map 255 and outputs a resulting fused feature map 260 to the encoder 215. The encoder 215 uses the fused feature map 260 to generate the latent vector 220. The generator 225 uses the latent vector 220 to generate the output video 230.

The computer 100 may be programmed to extract visual features from the video data. For the purposes of this disclosure, the term "feature" is used in its machine-learning sense as a piece of information about the content of a type of data (e.g., image, video, audio), specifically about whether a certain region of the data (e.g., image frame, spectrogram) has certain properties. Types of visual features may include edges, corners, blobs, etc. The visual features may take the form of the visual feature map 250. The visual feature map 250 includes a plurality of visual features. The visual feature map 250 provides locations in an image frame, e.g., in pixel coordinates, of the visual features. The visual feature map 250 has a reduced dimensionality compared to the image frame or video.

Extracting the visual features may include executing the visual feature extractor 235. The visual feature extractor 235 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The visual feature extractor 235 may include machine-learning operations. For example, the visual feature extractor 235 may include residual network (ResNet) layers followed by a convolutional neural network.

The computer 100 may be programmed to extract audio features from the audio data 210. The audio features may take the form of the audio feature map 255. The audio feature map 255 includes a plurality of audio features. The audio feature map 255 provides temporal positions or time-frequency positions in the audio data 210 of the audio features. The audio feature map 255 has a reduced dimensionality compared to the audio data 210.

Extracting the audio features may include executing the audio feature extractor 240. The audio feature extractor 240 may include one or more suitable techniques for feature extraction, e.g., low-, medium-, and/or high-level; instantaneous, segment-level, and/or global; time domain, frequency domain, and/or time-frequency representation; etc. The audio data 210 may be represented as a spectrogram, and the audio feature extractor 240 may treat the spectrogram as an image, with two-dimensional pixel coordinates representing time and frequency and a value of the pixel representing the amplitude at the respective time and frequency. The audio feature extractor 240 may thus perform similar analysis as described above for the visual feature extractor 235. The audio feature extractor 240 may include machine-learning operations. For example, the audio feature extractor 240 may include ResNet layers followed by a convolutional neural network.

The computer 100 may be programmed to fuse the visual features and the audio features, e.g., the visual feature map 250 and the audio feature map 255, resulting in the fused feature map 260. Data fusion is combining data from disparate sources together so that the resulting data has less uncertainty than if the data from each source were used individually, e.g., in creating a unified model of the surrounding environment. The data fusion may include concatenating the visual feature map 250 and the audio feature map 255. Alternatively or additionally, the data fusion can be performed with one or more algorithms, e.g., Kalman filter, central limit theorem, Bayesian networks, Dempster-Shafer, convolutional neural networks, etc.

The computer 100 may be programmed to map the input video 205 and the audio data 210 to the latent vector 220 in the lower-dimensional latent space. The latent space has a lower dimensionality than the input video 205 has and/or than the fused feature map 260 has. The latent space includes dimensions for the semantic content and excludes domain data for the type of domain that the first domain and second domain are (e.g., without precipitation data when converting from clear to rainy, or without resolution data when converting from low resolution to high resolution). The latent vector 220 provides values for the semantic content in the latent space.

The computer 100 may be programmed to execute the encoder 215 to map the input video 205 and the audio data 210 to the latent vector 220. Executing the encoder 215 may be based on the visual features and the audio features, e.g., on the fusion of the visual features and the audio features, e.g., on the fused feature map 260. For example, the encoder 215 may be or include an artificial neural network such as a residual neural network (ResNet). The encoder 215 may include a sequence of layers and may reduce a dimensionality of the data from one layer to the next layer. The output of the final layer may be the latent vector 220.

The computer 100 may be programmed to execute the generator 225 to generate the output video 230 of the scene from the latent vector 220. The latent vector 220 may be an input to the generator 225. For example, the generator 225 may be or include an artificial neural network such as a ResNet. The generator 225 may include a series of layers and may increase a dimensionality of the data from one layer to the next. The output of the final layer may be the output video 230.

The encoder 215 and the generator 225 are trained to maintain the same semantic content in the output video 230 as in the input video 205 while changing the domain from the first domain to the second domain. The encoder 215 and the generator 225 may be trained for a specific first domain and second domain of the same type. The encoder 215 and the generator 225 are further trained to maintain temporal consistency between the input video 205 and the output video 230, e.g., an event involving the semantic content occurs at the same time in both the input video 205 and the output video 230, by using the audio data 210, e.g., as included in the fused feature map 260.

Figure 3:
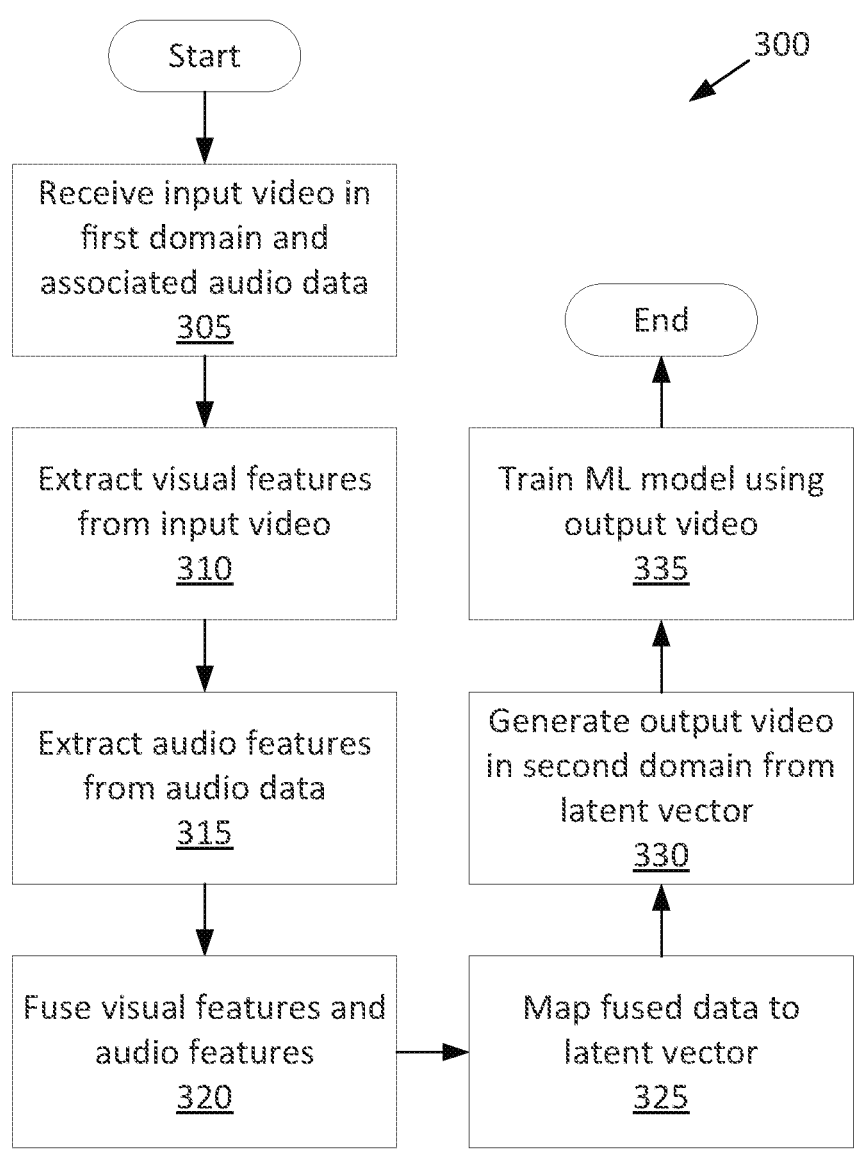
FIG. 3 is a process flow diagram of an example process for generating the artificial video.

FIG. 3 is a process flow diagram illustrating an example process 300 for generating the output video 230. The memory 110 of the computer 100 stores executable instructions for performing the steps of the process 300 and/or programming can be implemented in structures such as mentioned above. As a general overview of the process 300, the computer 100 receives the input video 205 and the associated audio data 210, extracts the visual and audio features from the input video 205 and audio data 210, fuses the visual and audio features, maps the fused data to the latent vector 220, generates the output video 230 from the latent vector 220, and trains a machine-learning model with the output video 230 as training data.

The process 300 begins in a block 305, in which the computer 100 receives the input video 205 of the scene in the first domain and the audio data 210 associated with the input video 205, as described above.

Next, in a block 310, the computer 100 extracts the visual features from the input video 205, as described above.

Next, in a block 315, the computer 100 extracts the audio features from the audio data 210, as described above.

Next, in a block 320, the computer 100 fuses the visual features and the audio features, as described above.

Next, in a block 325, the computer 100 executes the encoder 215 to map the input video 205 and the audio data 210 to the latent vector 220 in the lower-dimensional latent space, as described above.

Next, in a block 330, the computer 100 executes the generator 225 to generate the output video 230 of the scene in the second domain from the latent vector 220, as described above.

Next, in a block 335, the computer 100 trains a machine-learning model on training data that includes the output video 230. The machine-learning model may be an object-recognition model, e.g., using a convolutional neural network. The training data includes the output video 230. The training data may further include the input video 205 and/or similarly generated output videos 230 and associated input videos 205. Once trained, the machine-learning model may be installed on a vehicle computer of a vehicle 120, and the vehicle computer may be programmed to actuate the vehicle 120 based on classifications outputted by the machine-learning model, e.g., by actuating one or more of a propulsion system, a brake system, and/or a steering system of the vehicle 120. For example, the vehicle computer may use the classification of an object as a particular type of road user to determine an amount of lateral distance to maintain when passing the road user, e.g., a greater distance for a bicycle than for a motor vehicle. Because of the different domains represented in the training data used for training the machine-learning model, i.e., both the first domain and the second domain, the machine-learning model may classify objects accurately in a greater variety of conditions, thereby enhancing the autonomous operation of the vehicle 120. After the block 335, the process 300 ends.

Figure 4:
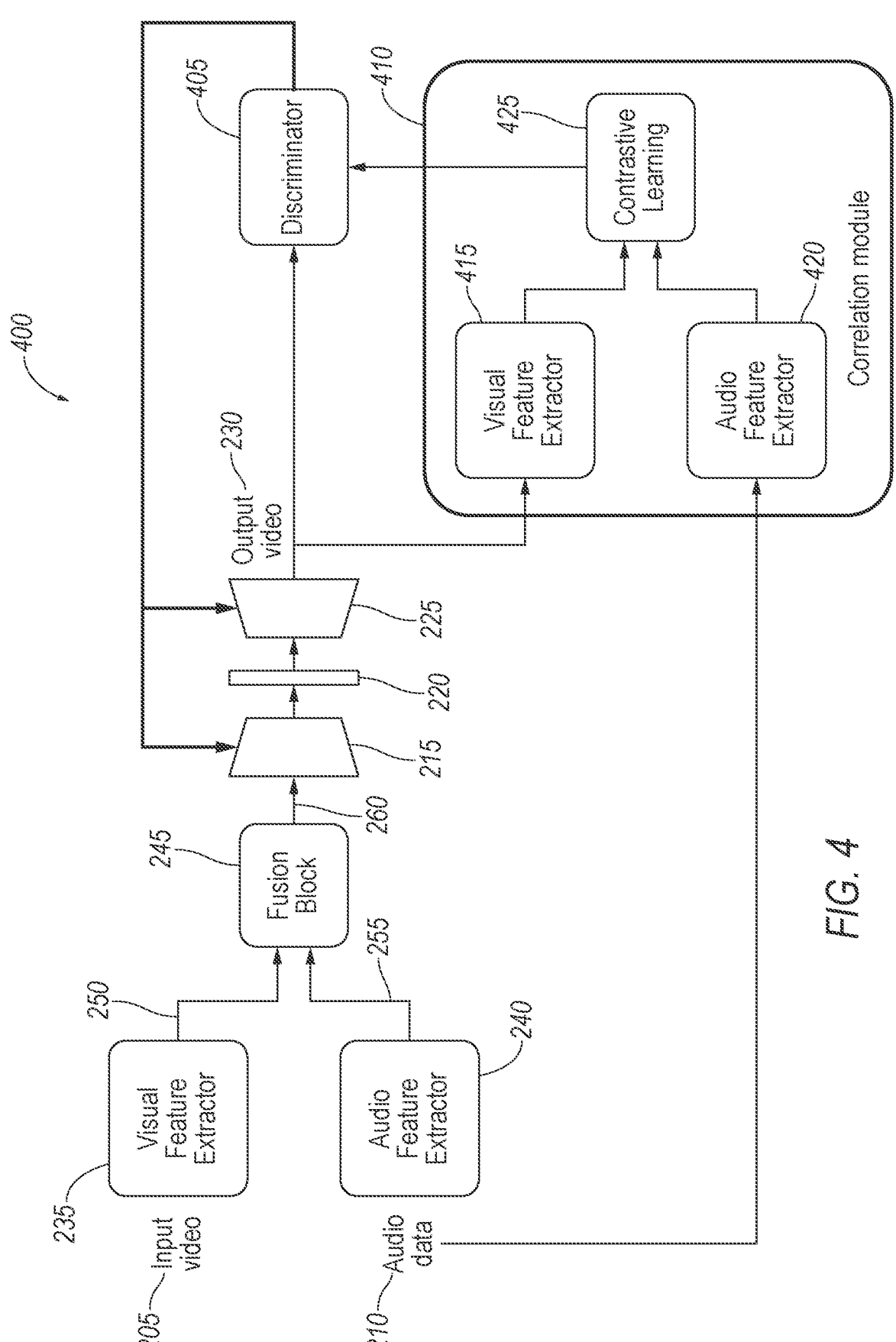
FIG. 4 is a diagram of an example training architecture for training the machine-learning architecture to generate the artificial video.
Figure 5:
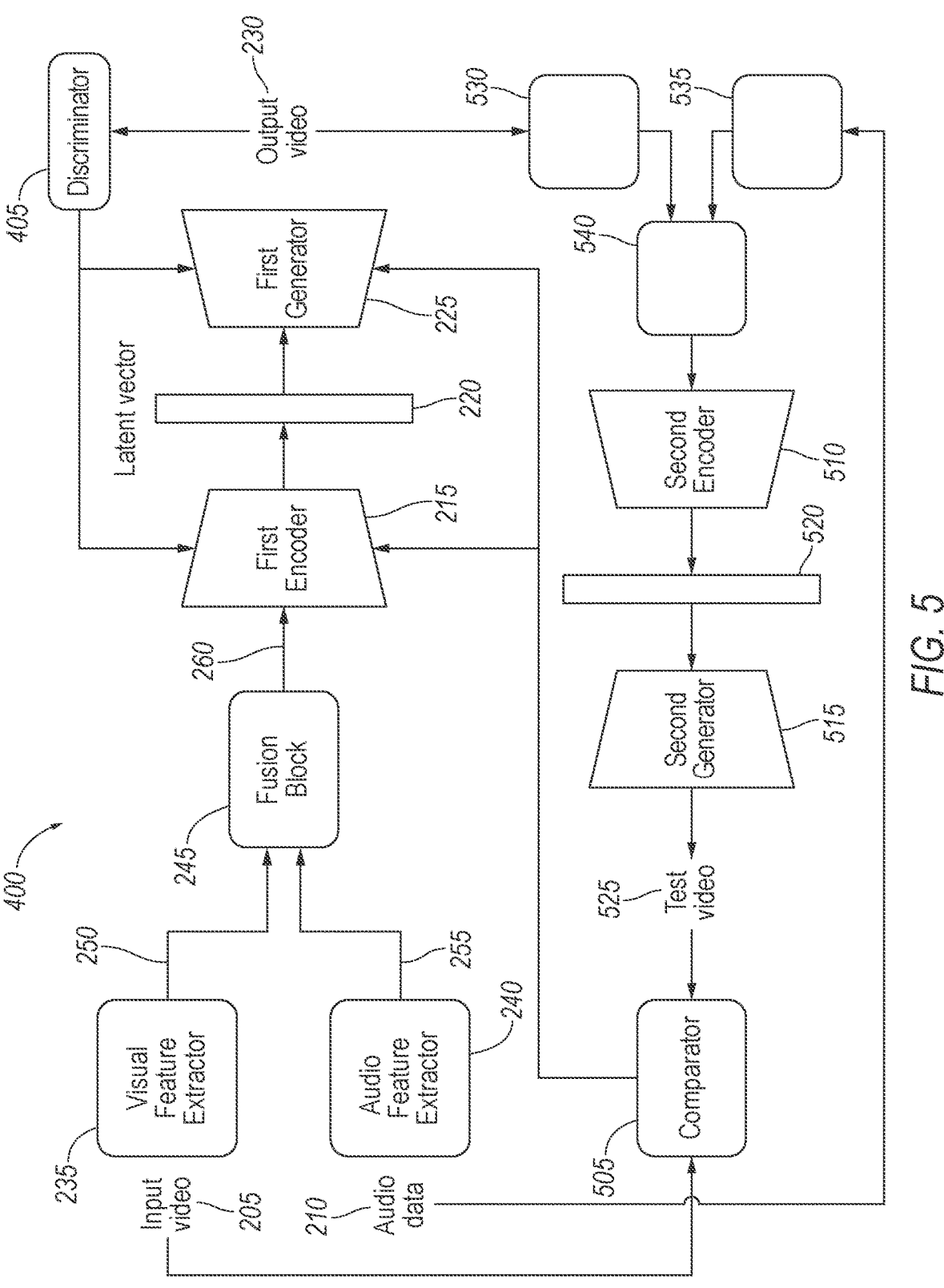
FIG. 5 is a diagram of another example training architecture for training the machine-learning architecture to generate the artificial video.

With reference to FIGS. 4-5, a training architecture 400 is shown for training the encoder 215 and the generator 225 to generate the output video 230 in the second domain based on the input video 205 in the first domain and based on the audio data 210 associated with the input video 205. The encoder 215 and the generator 225 are trained to maintain temporal consistency between the input video 205 and the output video 230 by using the audio data 210. The encoder 215 is trained to include the semantic content of the input video 205 in the latent vector 220 and to exclude domain data from the first domain of the input video 205 from the latent vector 220. The generator 225 is trained to construct the output video 230 including the semantic content from the latent vector 220 with the second domain applied. The encoder 215 and the generator 225 are trained for a specific first domain and a specific second domain of the same type as the first domain, e.g., daytime and nighttime, respectively; i.e., the encoder 215 and the generator 225 are trained to convert from one specific domain to another specific domain of the same type. This is beneficial so that the encoder 215 may be trained to exclude domain data from the type of domain of the first domain but not necessarily exclude domain data from other types of domains.

The training data for training the encoder 215 and the generator 225 may include a plurality of input videos 205 in the first domain and respective audio data 210 associated with the input videos 205. The training data may further include videos or images in the second domain that are not paired with the input videos 205 in the first domain, i.e., are of different scenes than captured in the input videos 205. Because the training architecture 400 uses the audio data 210 for supervision, the training architecture 400 does not need a video in the second domain of the same scene as an input video 205 in the first domain.

The training of the encoder 215 and the generator 225 includes iterative execution of the encoder 215 and the generator 225 together, i.e., joint training of the encoder 215 and the generator 225. For each iteration, a loss function may be calculated by a discriminator 405 (in the example of FIG. 4) or a discriminator 405 and a comparator 505 (in the example of FIG. 5). The loss function is based on a score of the temporal consistency of the output video 230 with the audio data 210 and based on a score of the output video 230 being in the second domain. The loss function is used to update the encoder 215 and the generator 225. e.g., adjusting weights within the encoder 215 and/or the generator 225. The training is completed in response to a termination condition being satisfied, e.g., the loss function being below a threshold value and/or the training elapsing for a preset number of iterations. The threshold value or the preset number of iterations may be chosen to indicate or produce accurate operation by the encoder 215 and the generator 225. Once the termination condition is satisfied, the encoder 215 and the generator 225 may be used as described above with respect to FIGS. 2 and 3.

With reference to FIG. 4, the training architecture 400 may include a correlation module 410. The correlation module 410 may include a correlation visual feature extractor 415, a correlation audio feature extractor 420, and a contrastive-learning block 425. The correlation visual feature extractor 415 and the correlation audio feature extractor 420 may operate similarly to the visual feature extractor 235 and the audio feature extractor 240, respectively, as described above. The correlation visual feature extractor 415 may receive the output videos 230 as inputs each iteration. The correlation audio feature extractor 420 may receive the audio data 210 (unchanged) as an input each iteration. The contrastive-learning block 425 receives the outputs from the correlation visual feature extractor 415 and the correlation audio feature extractor 420 as inputs. The contrastive-learning block 425 outputs a correlation score between the output video 230 of the current iteration and the audio data 210. The correlation score indicates a temporal closeness between events in the output video 230 and the audio data 210.

The correlation module 410, e.g., the contrastive-learning block 425, may be pretrained, i.e., trained separately from the rest of the training architecture 400 before training the encoder 215 and the generator 225. The correlation module 410, e.g., the contrastive-learning block 425, may be trained using contrastive learning using pairs of samples. Each pair includes a positive sample and a negative sample. The positive sample may be one of the input videos 205 along with the audio data 210 synched to the input video 205, and the negative sample may be the same input video 205 along with the audio data 210 time-shifted with respect to the input video 205. The correlation module 410 may thus be trained using easy-to-gather training data that does not require manual annotation.

The encoder 215 and the generator 225 may be supervised by the discriminator 405 during training. For example, the generator 225 and the discriminator 405 may together constitute a generative adversarial network. The discriminator 405 may be a machine-learning model, e.g., a convolutional neural network. The discriminator 405 may be trained to classify inputs as (a) temporally consistent or (b) temporally inconsistent. The discriminator 405 may also be trained to classify inputs as (a) actual videos in the second domain or (b) output videos 230 in the second domain from the generator 225. The discriminator 405 may be jointly trained with the generator 225 (and the encoder 215). The inputs to the discriminator 405 are the output videos 230 generated by the generator 225 each iteration.

The discriminator 405 may supervise the training of the encoder 215 and the generator 225 by testing a consistency of the output video 230 with the audio data 210. For example, the discriminator 405 may receive the correlation score from the correlation module 410 each iteration. The classification outputted by the discriminator 405 may be based on the correlation score as well as on the output videos 230 and the audio data 210 as direct inputs. The computer 100 determines an adversarial loss based on the accuracy of the classification by the discriminator 405. The computer 100 updates the encoder 215 and the generator 225 based on the adversarial loss, i.e., according to a generative-adversarial-network scheme, e.g., by adjusting weights within the encoder 215 and/or the generator 225. The computer 100 also updates the discriminator 405 based on the adversarial loss, i.e., according to a generative-adversarial-network scheme, e.g., by adjusting weights within the discriminator 405.

The discriminator 405 may supervise the training of the encoder 215 and the generator 225 by testing a consistency of the output video 230 with the second domain. For example, the discriminator 405 may receive the output videos 230 generated by the generator 225 and actual videos in the second domain, i.e., training data as described above. The discriminator 405 attempts to classify the videos as actual or as generated by the generator 225. The computer 100 determines an adversarial loss based on the accuracy of the classification. The computer 100 updates the encoder 215 and the generator 225 based on the adversarial loss, i.e., according to a generative-adversarial-network scheme, e.g., by adjusting weights within the encoder 215 and/or the generator 225. The computer 100 also updates the discriminator 405 based on the adversarial loss, i.e., according to a generative-adversarial-network scheme, e.g., by adjusting weights within the discriminator 405.

With reference to FIG. 5, the training architecture 400 may include a second encoder 510, a second generator 515, and the comparator 505, in addition to the discriminator 405. (For clarity, the encoder 215 and the generator 225 will be referred to as the first encoder 215 and the first generator 225, respectively, in the discussion of FIG. 5.) The discriminator 405 may supervise the training of the first encoder 215 and the first generator 225 by testing a consistency of the output video 230 with the second domain, as described above in the example of FIG. 4. In this example, the discriminator 405 is not used for testing the consistency of the output video 230 with the audio data 210, i.e., the temporal consistency. Alternatively, the training architecture 400 may further include the correlation module 410 described above, and the discriminator 405 may be used for both consistencies as described above. In that case, the discriminator 405 is trained jointly with the second encoder 510 and second generator 515 described below, as well as with the rest of the training architecture 400.

The second encoder 510 and the second generator 515 may have the same structure as the first encoder 215 and the first generator 225, respectively, as described above with respect to FIG. 2. The training architecture 400 may further include a second visual feature extractor 530, a second audio feature extractor 535, and a second fusion block 540, which operate in the same manner as described above for the visual feature extractor 235, the audio feature extractor 240, and the fusion block 245, respectively. The second encoder 510 may receive the output video 230 in the second domain from the generator 225, as well as the audio data 210, after processing by the second visual feature extractor 530, second audio feature extractor 535, and second fusion block 540. The second encoder 510 may execute to map the output video 230 and the audio data 210 to a second latent vector 520 in the lower-dimensional latent space. The second generator 515 may execute to generate a test video 525 in the first domain from the second latent vector 520. In other words, the second encoder 510 and the second generator 515 are trained to convert video from the second domain to the first domain, the reverse of the first encoder 215 and the first generator 225. The audio data 210 inputted into the second encoder 510 is the same as the audio data 210 inputted into the first encoder 215.

The comparator 505 determines a difference between the test video 525 and the input video 205, e.g., a level of cycle consistency. The input video 205 and the test video 525 are both in the first domain. The comparator 505 may be a pretrained module. The computer 100 may calculate a loss function based on the difference, e.g., a cycle consistency loss as used in cycle-consistent adversarial networks such as cycleGAN. The computer 100 updates the first encoder 215, the first generator 225, the second encoder 510, and the second generator 515 based on the loss function, e.g., by adjusting weights within the first encoder 215, the first generator 225, the second encoder 510, and the second generator 515. The second generator 515 and the second encoder 510 may thus be jointly trained with the first encoder 215 and the first generator 225.

Figure 6:
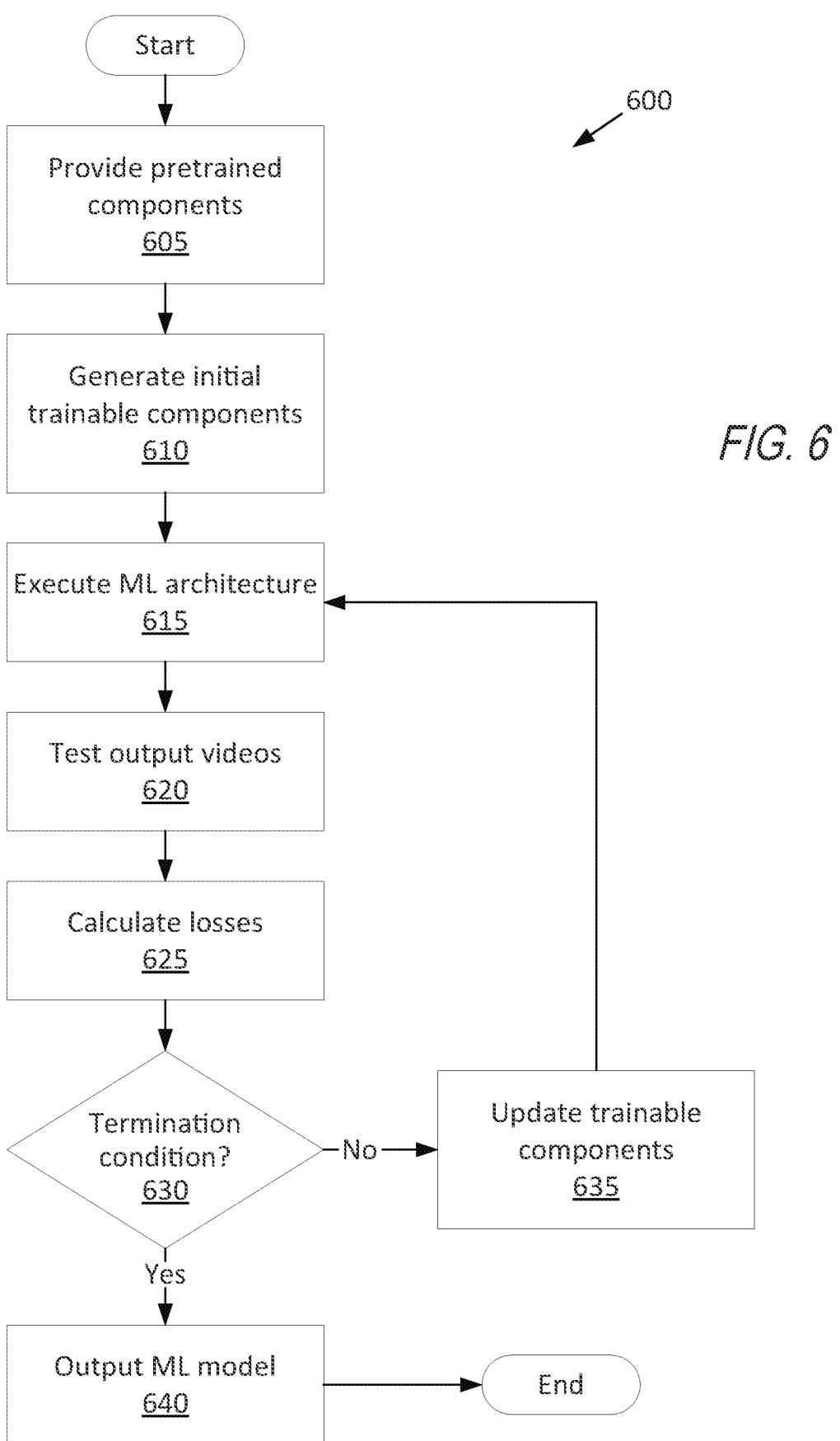
FIG. 6 is a process flow diagram of an example process for training the machine-learning architecture to generate the artificial video.

FIG. 6 is a process flow diagram illustrating an example process 600 for training the machine-learning architecture 200. The memory 110 of the computer 100 stores executable instructions for performing the steps of the process 600 and/or programming can be implemented in structures such as mentioned above. As a general overview of the process 600, the computer 100 provides pretrained components of the training architecture 400 and generates the initial values of the trainable components of the training architecture 400, including the encoder 215 and generator 225. The computer 100 then iteratively executes the training architecture 400. During each iteration, the computer 100 executes the machine-learning architecture 200 to generate the output videos 230, tests the output videos 230, and updates the training architecture 400 based on testing the output videos 230. Upon reaching a termination condition, the computer 100 outputs the encoder 215 and the generator 225 from the final iteration.

The process 600 begins in a block 605, in which the computer 100 provides pretrained components of the training architecture 400, e.g., the correlation module 410 in the example of FIG. 4 or the comparator 505 in the example of FIG. 5. For example, the computer 100 may load components already installed on the computer 100.

Next, in a block 610, the computer 100 generates the initial encoder 215 and generator 225. For example, the computer 100 may assign weights at random to the structures described above for the encoder 215 and the generator 225. The computer 100 may also generate initial values for the other components of the training architecture 400 that will be trained, e.g., the discriminator 405 in the example of FIG. 4 or the second encoder 510, second generator 515, and discriminator 405 in the example of FIG. 5. The computer 100 may assign weights at random to the structures described above for these components.

Next, in a block 615, the computer 100 executes the machine-learning architecture 200, including the encoder 215 and the generator 225, as described above. The inputs are the training data of input videos 205 in the first domain and the respective associated audio data 210.

Next, in a block 620, the computer 100 tests the output videos 230 generated in the block 615. For example, as described with respect to FIG. 4, the computer 100 may execute the correlation module 410 to output correlation scores to the discriminator 405 and execute the discriminator 405 to classify the output videos 230 and other training videos. For another example, as described with respect to FIG. 5, the computer 100 may execute the discriminator 405 to classify the output videos 230 and other training videos, execute the second encoder 510 and second generator 515 to output the test videos 525, and execute the comparator 505 to determine differences between the input videos 205 and the respective test videos 525.

Next, in a block 625, the computer 100 calculates the loss functions based on the results from the block 620, as described above.

Next, in a decision block 630, the computer 100 determines whether the termination condition is satisfied, as described above. If not, the process 600 proceeds to a block 635 to update the trainable components for a next iteration of training. If so, the process 600 proceeds to a block 640.

In the block 635, the computer 100 updates the trainable components of the training architecture 400 based on the losses calculated in the block 625, as described above. The computer 100 updates the encoder 215 and the generator 225. The computer 100 may also update the discriminator 405 in the example of FIG. 4 or the discriminator 405, the second encoder 510, and the second generator 515 in the example of FIG. 5. After the block 635, the process 600 returns to the block 615 for the next iteration of training.

In the block 640, the computer 100 outputs the encoder 215 and the generator 225 in their current state, i.e., with the values of the weights as updated in the iterations of training. After the block 640, the process 600 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein.

Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive an input video of a scene and audio data associated with the input video, the input video being in a first domain;
   execute an encoder to map the input video and the audio data to a latent vector in a lower-dimensional latent space; and
   execute a generator to generate an output video of the scene from the latent vector, the output video being in a second domain;
   wherein the encoder and the generator are trained to maintain temporal consistency between the input video and the output video by using the audio data.

2. The computer of claim 1, wherein the encoder and the generator are supervised by a discriminator during training.

3. The computer of claim 2, wherein the discriminator supervises the training of the encoder and the generator by testing a consistency of the output video with the audio data.

4. The computer of claim 3, wherein, while training the encoder and the generator, the discriminator uses a correlation between the output video and the audio data to test the consistency of the output video with the audio data.

5. The computer of claim 4, wherein, while training the encoder and the generator, the discriminator receives the correlation from a correlation module, the correlation module being pretrained with contrastive learning.

6. The computer of claim 2, wherein the discriminator supervises the training of the encoder and the generator by testing a consistency of the output video with the second domain.

7. The computer of claim 6, wherein the instructions further include instructions to determine an adversarial loss based on an output of the discriminator and to update the encoder and the generator based on the adversarial loss.

8. The computer of claim 1, wherein the first domain and the second domain are mutually exclusive environmental conditions of the scene.

9. The computer of claim 8, wherein the environmental conditions are one of a lighting condition or a weather condition.

10. The computer of claim 1, wherein the first domain and the second domain are mutually exclusive visual rendering characteristics of the input video and output video.

11. The computer of claim 10, wherein the visual rendering characteristics are one of a resolution, a color representation scheme, or simulatedness.

12. The computer of claim 1, wherein
   the instructions further include instructions to extract visual features from the input video; and
   executing the encoder is based on the visual features.

13. The computer of claim 12, wherein
   the instructions further include instructions to extract audio features from the audio data and to fuse the visual features and the audio features; and
   executing the encoder is based on the fusion of the visual features and the audio features.

14. The computer of claim 1, wherein the instructions further include instructions to extract audio features from the audio data; and executing the encoder is based on the audio features.

15. The computer of claim 1, wherein the encoder is trained to include semantic content of the input video in the latent vector and to exclude domain data of the input video from the latent vector.

16. The computer of claim 1, wherein the encoder is a first encoder;

the generator is a first generator;

the latent vector is a first latent vector; and training the first encoder and the first generator includes executing a second encoder to map the output video and the audio data to a second latent vector in the lower-dimensional latent space, and executing a second generator to generate a test video of the scene from the second latent vector in the first domain.

17. The computer of claim 16, wherein training the first encoder and the first generator includes updating the first encoder and the first generator based on a difference between the test video and the input video.

18. The computer of claim 1, wherein the instructions further include instructions to train a machine-learning model on training data; and the training data includes the output video.

19. The computer of claim 18, wherein the machine-learning model is an object-recognition model.

20. A method comprising:

receiving an input video of a scene and audio data associated with the input video, the input video being in a first domain;

executing an encoder to map the input video and the audio data to a latent vector in a lower-dimensional latent space; and executing a generator to generate an output video of the scene from the latent vector, the output video being in a second domain;

wherein the encoder and the generator are trained to maintain temporal consistency between the input video and the output video by using the audio data.

* * * * *